United States Patent [19]

Shrewsbury-Gee

[11] Patent Number: 5,661,462
[45] Date of Patent: Aug. 26, 1997

[54] BATH OVERFLOW ALARM

[76] Inventor: Christopher Shrewsbury-Gee, 183 Silver Throne Cres., Kamloops, BC, Canada, V2C 1R4

[21] Appl. No.: 643,487

[22] Filed: May 6, 1996

[51] Int. Cl.⁶ ................................. G08B 21/00
[52] U.S. Cl. .................. 340/618; 340/562; 4/538; 137/392
[58] Field of Search ..................... 340/618, 616, 340/562, 624; 73/DIG. 5, 290 R, 307, 308, 317; 68/208; 116/227, 109; 137/392, 393, 386; 4/538, 668, 651; 200/84 A, 84 C, 84 R; D10/106

[56] References Cited

U.S. PATENT DOCUMENTS

| | | | |
|---|---|---|---|
| 3,889,247 | 6/1975 | Voll | 340/618 |
| 4,042,984 | 8/1977 | Butler | 4/538 |
| 4,265,598 | 5/1981 | Brand | 200/84 R |
| 4,563,780 | 1/1986 | Pollack | 137/392 |
| 4,607,658 | 8/1986 | Fraser et al. | 137/393 |
| 5,247,710 | 9/1993 | Carder et al. | 137/392 |

*Primary Examiner*—Jeffery Hofsass
*Assistant Examiner*—John Tweel, Jr.

[57] ABSTRACT

A bath overflow alarm comprised of a housing having a pair of slots formed through a lower end thereof. The housing has a waterproof battery chamber therein for active receipt of a battery. The housing is adapted for securement to a bathtub. A pair of water contacts are secured within the housing. An alarm mechanism is secured within the housing disposed above the pair of water contacts. Once water enters into the housing through the slots, the water contacts signal the alarm mechanism which will alert a person as to a dangerous water level.

6 Claims, 3 Drawing Sheets

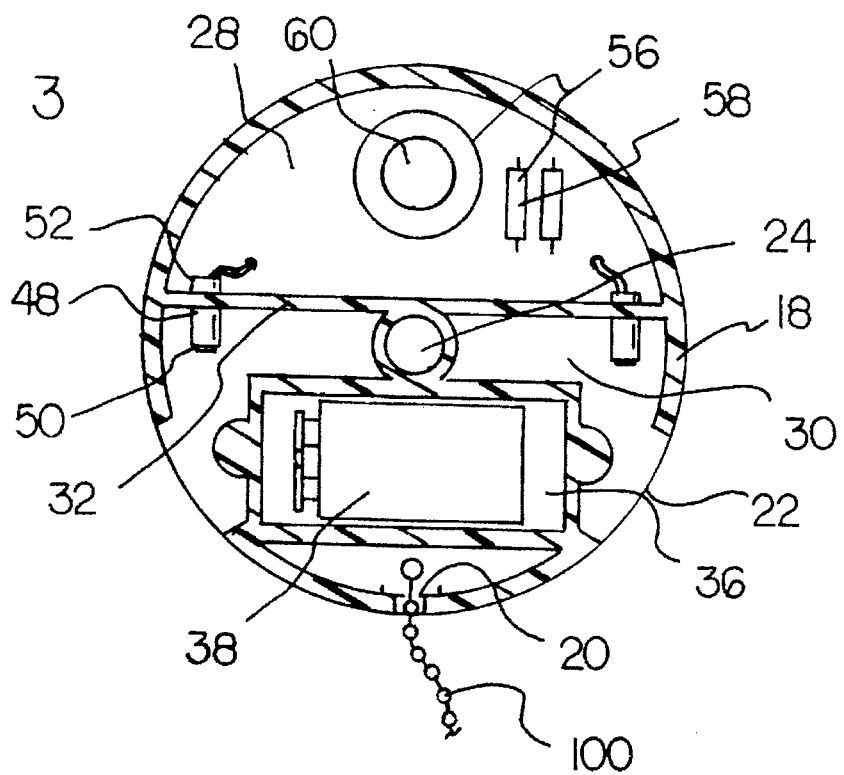
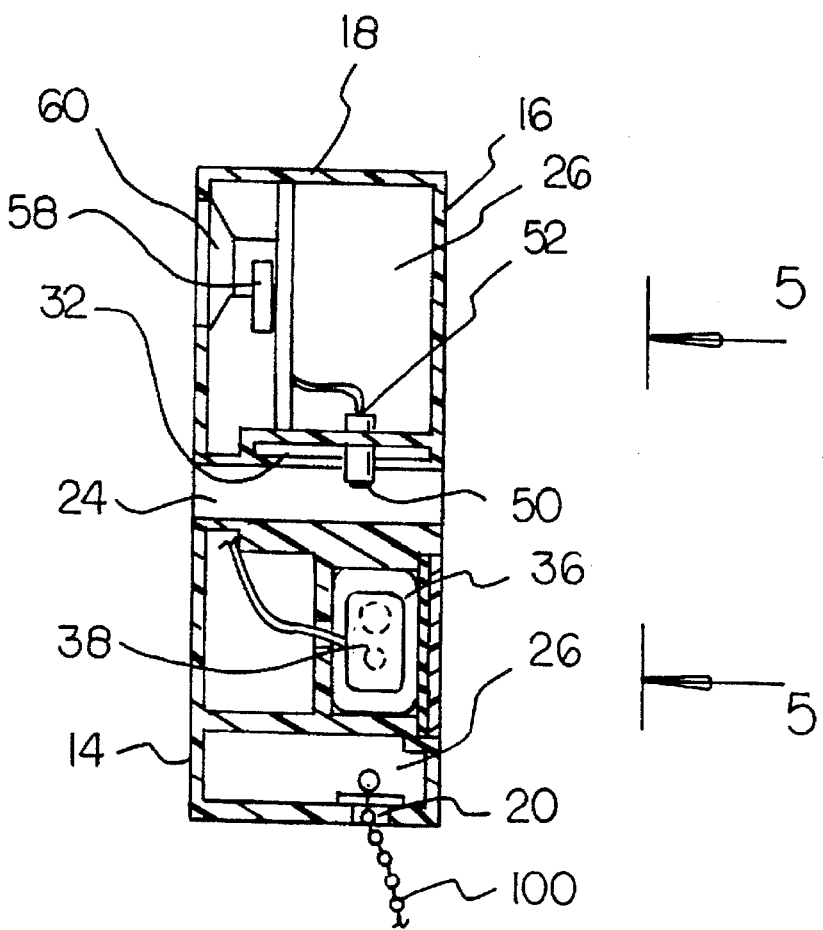

BATH OVERFLOW ALARM

BACKGROUND OF THE INVENTION

1. Field of the Invention

The present invention relates to a bath overflow alarm and more particularly pertains to alerting a user to water reaching a dangerous level within a bathtub with a bath overflow alarm.

People often undertake other activities while waiting for their bathtub to fill to the desired level in order to take a bath. Sometimes they will forget that the water is running while becoming engrossed in some other activity. Although most bathtubs are equipped with drain covers to prevent the overflow of the water, the waste of water is undesirable and sometimes costly.

2. Description of the Prior Art

The use of water level indicators is known in the prior art. More specifically, water level indicators heretofore devised and utilized for the purpose of indicating the level of bath water are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,757,305 to Peso discloses a water level indicator useful for signaling a variety of different water levels within a bathtub contained within a portable housing.

U.S. Pat. No. 4,258,444 to Orszullok discloses a water level control system for use with bathtubs including a captive proximity switch disposed externally with respect to the bathtub.

U.S. Pat. No. Des. 313,567 to Henry discloses the ornamental design for an alarm for detecting bathtub water levels.

U.S. Pat. No. 4,080,985 to Eagle discloses a water level alarm apparatus.

U.S. Pat. No. 5,125,247 to Mills discloses a washing machine overflow prevention device signal quality indicator.

U.S. Pat. No. 4,771,272 to Barnes discloses a pendent liquid level alarm apparatus.

While these devices fulfill their respective, particular objective and requirements, the aforementioned patents do not describe a bath overflow alarm for alerting a user to water reaching a dangerous level within a bathtub.

In this respect, the bath overflow alarm according to the present invention substantially departs from the conventional concepts and designs of the prior art, and in doing so provides an apparatus primarily developed for the purpose of alerting a user to water reaching a dangerous level within a bathtub.

Therefore, it can be appreciated that there exists a continuing need for new and improved bath overflow alarm which can be used for alerting a user to water reaching a dangerous level within a bathtub. In this regard, the present invention substantially fulfills this need.

SUMMARY OF THE INVENTION

In the view of the foregoing disadvantages inherent in the known types of water level indicators now present in the prior art, the present invention provides an improved bath overflow alarm. As such, the general purpose of the present invention, which will be described subsequently in greater detail, is to provide a new and improved bath overflow alarm and method which has all the advantages of the prior art and none of the disadvantages.

To attain this, the present invention essentially comprises a circular housing having a planar inner surface, a planar outer surface, a circular side wall therebetween, and a hollow interior. The circular side wall has an opening formed through a lower portion thereof. The circular side wall has a pair of slots formed therethrough positioned on opposing sides of the opening thereof. The circular housing has a central aperture formed therethrough extending through the planar inner surface and the planar outer surface. The planar outer surface has a grill formed on an upper portion thereof. The hollow interior has a waterproof battery chamber therein for active receipt of a battery. The planar inner surface has a rectangular opening therein accessing the waterproof battery chamber. The planar inner surface has a cover removably secured over the rectangular opening therein. The circular housing is adapted for securement to an existing overflow drain cover of a bathtub by a screw extending through the central aperture. A pair of water contacts are secured within the hollow interior of the circular housing. The pair of water contacts are positioned above the pair of slots. The pair of water contacts are electrically coupled with the battery. An alarm mechanism is secured within the hollow interior of the circular housing disposed above the pair of water contacts. The alarm mechanism includes circuitry being electrically coupled with the pair of water contacts. The alarm mechanism has a speaker positionable inwardly of the grill on the outer planar surface of the housing. The alarm mechanism is electrically coupled with the circuitry.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bath overflow alarm which has all the advantages of the prior art water level indicators and none of the disadvantages.

It is another object of the present invention to provide a new and improved bath overflow alarm which may be easily and efficiently manufactured and marketed.

It is a further object of the present invention to provide a new and improved bath overflow alarm which is of durable and reliable construction.

An even further object of the present invention is to provide a new and improved bath overflow alarm which is susceptible of a low cost of manufacture with regard to both materials and labor, and which accordingly is then susceptible of low prices of sale to the consuming public, thereby making such a bath overflow alarm economically available to the buying public.

Still yet another object of the present invention is to provide a new and improved bath overflow alarm which provides in the apparatuses and methods of the prior art some of the advantages thereof, while simultaneously overcoming some of the disadvantages normally associated therewith.

Even still another object of the present invention is to provide a new and improved bath overflow alarm for alerting a user to water reaching a dangerous level within a bathtub.

Lastly, it is an object of the present invention to provide a new and improved bath overflow alarm comprised of a housing having a pair of slots formed through a lower end thereof. The housing has a waterproof battery chamber therein for active receipt of a battery. The housing is adapted for securement to a bathtub. A pair of water contacts are secured within the housing. An alarm mechanism is secured within the housing disposed above the pair of water contacts. Once water enters into the housing through the slots, the water contacts signal the alarm mechanism which will alert a person as to a dangerous water level.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the housing showing a front view of the components contained therein as taken along line 3—3 of FIG. 2.

FIG. 4 is a cross-sectional view of the housing showing a side view of the components contained therein as taken along line 4—4 of FIG. 2.

The same reference numerals refer to the same parts through the various Figures.

DESCRIPTION OF THE PREFERRED EMBODIMENT

Figure 1:
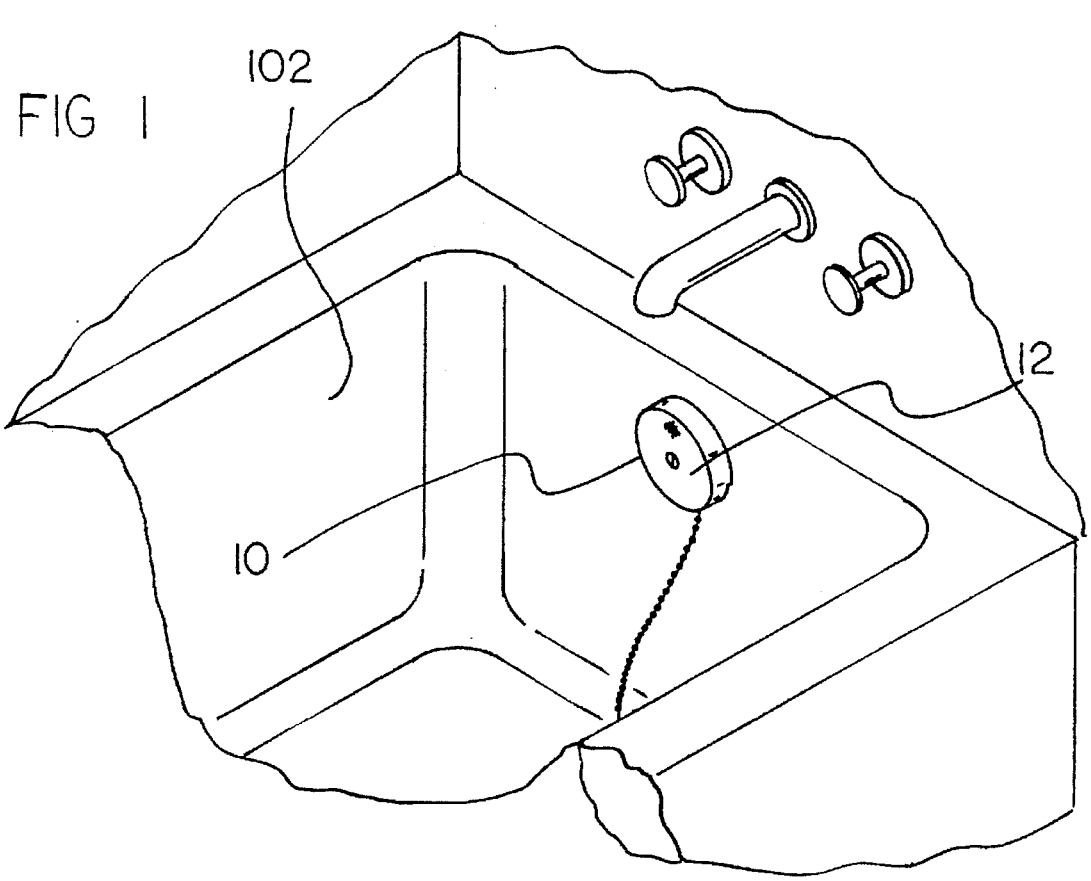
FIG. 1 is a perspective view of the preferred embodiment of the bath overflow alarm constructed in accordance with the principles of the present invention.
Figure 2:
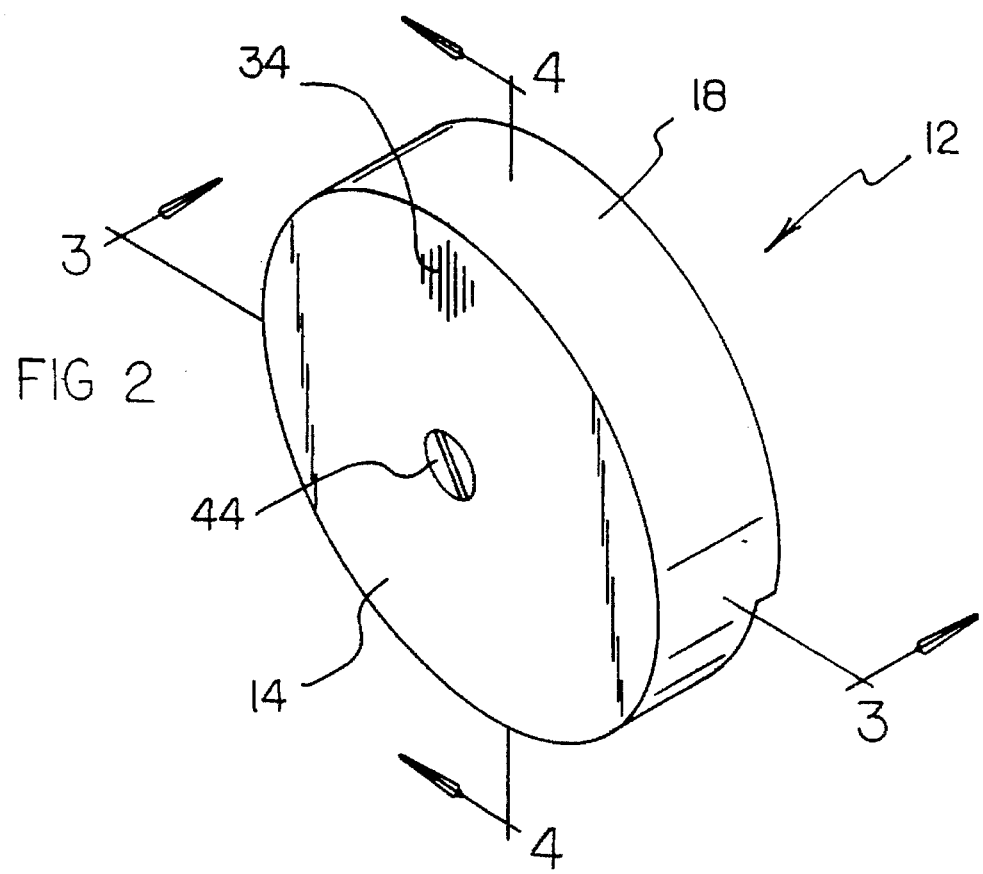
FIG. 2 is a plan perspective view of the preferred embodiment of the present invention.
Figure 5:
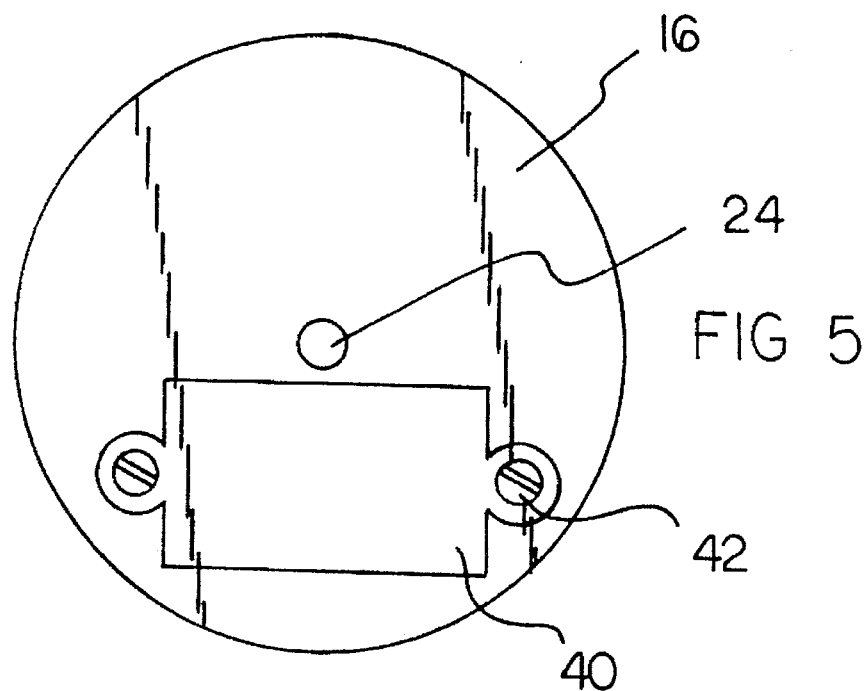
FIG. 5 is a rear elevation view of the housing of the present invention illustrating the removable access door to the battery chamber taken along line 5—5 of FIG. 4.

With reference now to the drawings, and in particular, to FIGS. 1–6 thereof, the preferred embodiment of the new and improved bath overflow alarm embodying the principles and concepts of the present invention and generally designated by the reference number 10 will be described.

Specifically, it will be noted in the various Figures that the device relates to a new and improved bath overflow alarm for alerting a user to water reaching a dangerous level within a bathtub. In its broadest context, the device consists of a circular housing, a pair of water contacts, and an alarm mechanism. Such components are individually configured and correlated with respect to each other so as to attain the desired objective.

The device 10 includes a circular housing 12 having a planar inner surface 14, a planar outer surface 16, a circular side wall 18 therebetween, and a hollow interior. The housing 12 having a circular configuration is preferred, however, other geometric shapes could be used. The circular side wall 18 has an opening 20 formed through a lower portion thereof. The opening 20 is adapted for the receipt of a drain plug chain 100 therein for securement within the hollow interior. The circular side wall 18 has a pair of slots 22 formed therethrough positioned on opposing sides of the opening 20 thereof. The pair of slots 22 should be of sufficient size to permit the passage of water therethrough. The circular housing 12 has a central aperture 24 formed therethrough extending through the planar inner surface 14 and the planar outer surface 16. The central aperture 24 divides the hollow interior into two equal sections 26. An upper section 28 is separated from a lower section 30 by a dividing wall 32. The dividing wall 32 precludes the movement of water from the lower section 30 into the upper section 28. The planar outer surface 14 has a grill 34 formed on an upper portion thereof. The hollow interior has a waterproof battery chamber 36 therein for active receipt of a battery 38. The planar inner surface 16 has a rectangular opening therein accessing the waterproof battery chamber 36. The planar inner surface 16 has a cover 40 removably secured over the rectangular opening therein. The cover 40 is secured over the rectangular opening by a pair of screws 42 on opposing ends thereof. The circular housing 12 is adapted for securement to an existing overflow drain cover of a bathtub 102 by a screw 44 extending through the central aperture 24. The circular housing 12 would need to be removed from the bathtub 102 in order to have access to the cover 40 to gain access to the waterproof battery chamber 36.

A pair of water contacts 48 are secured within the hollow interior of the circular housing 12. The pair of water contacts 48 are positioned above the pair of slots 22. The pair of water contacts 48 are electrically coupled with the battery 38. The pair of water contacts 48 each have a first end 50 extending through the dividing wall 32 into the lower section 30 to be contacted by incoming water through the pair of slots 22. The pair of water contacts 48 each have a second end 52 within the upper section 28 of the hollow interior of the circular housing 12 protected from contact with the water entering into the circular housing 12. The water contacts 48 sense the water level and activate relay circuitry to sound an alarm.

An alarm mechanism 56 is secured within the hollow interior of the circular housing 12 disposed above the pair of water contacts 48. The alarm mechanism 56 is protected from water entering into the circular housing 12. The alarm mechanism 56 includes circuitry 58 being electrically coupled with the pair of water contacts 48. The circuitry 58 receives signals from the pair of water contacts 48 that the water level within the bathtub 102 is too high. The alarm mechanism 56 has a speaker 60 positionable inwardly of the grill 34 on the outer planar surface 14 of the housing 12. The speaker 60 has a membrane film thereover to protect it from any splashed water entering into the circular housing through the grill 34. The alarm mechanism 56 is electrically coupled with the battery 38. The speaker 60 is signaled by the circuitry 58 to sound an alarm within the speaker 60 to alert a person the water level within the bathtub 102 is dangerously high.

Figure 6:
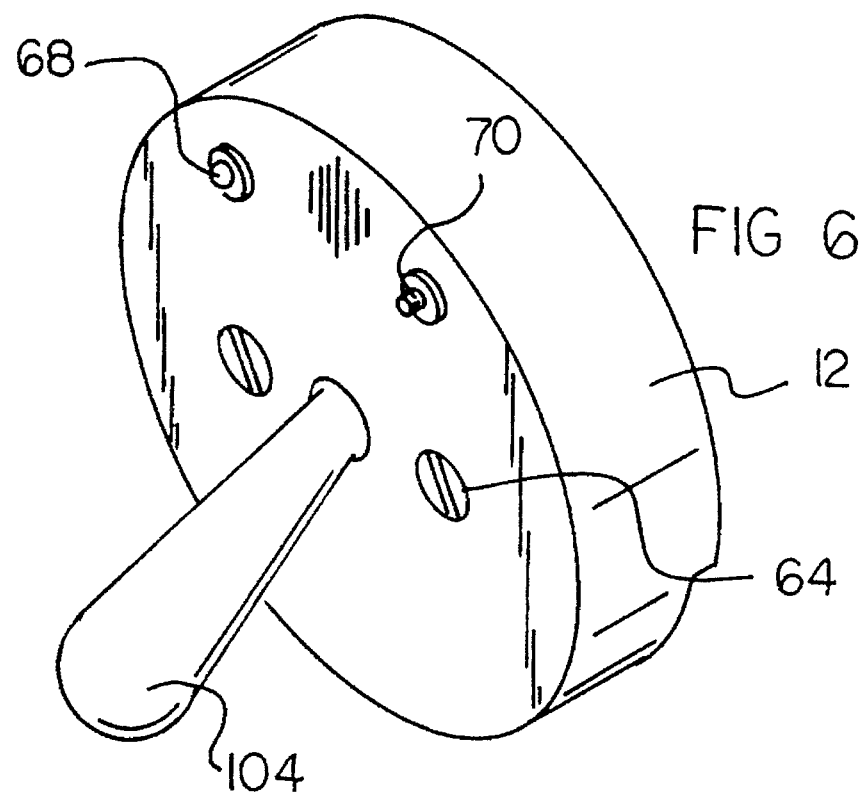
FIG. 6 is a perspective view of a second embodiment of the present invention.

A second embodiment of the present invention is shown in FIG. 6 and includes substantially all of the components of the present invention further including where the housing 12 is adapted for use with bathtubs 102 having toggles for pop-up style drain plugs. The central aperture 24 of the housing 12 is adapted for receipt of the toggle. The housing 12 is constructed with two additional apertures on opposing sides of the central aperture 24 to allow the housing 12 to be secured to the bathtub 102.

A third embodiment of the present invention is also shown in FIG. 6 and includes substantially all of the components of the present invention and further including a test button 68 and a silence button 70 incorporated into the housing 12. The test button 68 would be pressed to test the strength of the battery's 38 sounding of the alarm mechanism 56. Once the strength of the battery's 38 sounding of the alarm mechanism 56 is determined, the silence button 70 is pressed to silence the alarm mechanism 56.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A bath overflow alarm for alerting a user to water reaching a dangerous level within a bathtub comprising, in combination:

a circular housing having a planar inner surface, a planar outer surface, a circular side wall therebetween, and a hollow interior, the circular side wall having an opening formed through a lower portion thereof, the circular side wall having a pair of slots formed therethrough positioned on opposing sides of the opening thereof, the circular housing having a central aperture formed therethrough extending through the planar inner surface and the planar outer surface, the planar outer surface having a grill formed on an upper portion thereof, the hollow interior having a waterproof battery chamber therein for active receipt of a battery, the planar inner surface having a rectangular opening therein accessing the waterproof battery chamber, the planar inner surface having a cover removably secured over the rectangular opening therein, the circular housing adapted for securement to an existing overflow drain cover of a bathtub by a screw extending through the central aperture;

a pair of water contacts secured within the hollow interior of the circular housing, the pair of water contacts positioned above the pair of slots, the pair of water contacts being electrically coupled with the battery;

an alarm mechanism secured within the hollow interior of the circular housing disposed above the pair of water contacts, the alarm mechanism including circuitry being electrically coupled with the pair of water contacts, the alarm mechanism having a speaker positionable inwardly of the grill on the outer planar surface of the housing, the alarm mechanism being electrically coupled with the battery.

2. A bath overflow alarm comprising:

a housing having a pair of slots formed through a lower end thereof, the housing having a waterproof battery chamber therein for active receipt of a battery, the circular housing adapted for securement to an existing overflow drain cover of a bathtub;

a pair of water contacts secured within the housing;

an alarm mechanism secured within the housing disposed above the pair of water contacts.

3. The alarm as set forth in claim 2 wherein the housing having a planar inner surface, a planar outer surface, a side wall therebetween, and a hollow interior, the side wall having an opening formed through a lower portion thereof, the pair of slots formed therethrough positioned on opposing sides of the opening thereof, the housing having a central aperture formed therethrough extending through the planar inner surface and the planar outer surface, the planar outer surface having a grill formed on an upper portion thereof, the planar inner surface having a rectangular opening therein accessing the waterproof battery chamber, the planar inner surface having a cover removably secured over the rectangular opening therein, the circular housing adapted for securement to an existing overflow drain cover of a bathtub by a screw extending through the central aperture.

4. The alarm as set forth in claim 2 wherein the alarm mechanism including circuitry being electrically coupled with the pair of water contacts, the alarm mechanism having a speaker positionable inwardly of a grill on an outer planar surface of the housing, the alarm mechanism being electrically coupled with the battery.

5. A bath overflow alarm comprising:

a housing having a pair of slots formed through a lower end thereof, the housing having a waterproof battery chamber therein for active receipt of a battery, the housing having a central aperture formed therethrough for receipt of a toggle for a pop-up style drain plug therethrough;

a pair of water contacts secured within the housing;

an alarm mechanism secured within the housing disposed above the pair of water contacts.

6. The alarm as set forth in claim 2 and further including a test button and a silence button incorporated into the housing, the test button and the silence button being electrically coupled with the alarm mechanism.

* * * * *